United States Patent
Murata

(10) Patent No.: US 7,308,875 B2
(45) Date of Patent: Dec. 18, 2007

(54) INTAKE CONTROL APPARATUS OF INTERNAL COMBUSTION ENGINE

(75) Inventor: Shinichi Murata, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/398,559

(22) Filed: Apr. 6, 2006

(65) Prior Publication Data

US 2006/0225678 A1    Oct. 12, 2006

(30) Foreign Application Priority Data

Apr. 8, 2005    (JP) ............................ P2005-112780
Apr. 8, 2005    (JP) ............................ P2005-112791
Feb. 24, 2006   (JP) ............................ P2006-048166

(51) Int. Cl.
*F01L 1/34* (2006.01)

(52) U.S. Cl. ............................... 123/90.16; 123/90.31; 123/348

(58) Field of Classification Search ............. 123/90.15, 123/90.16, 90.17, 90.27, 90.31, 345, 346, 123/347, 348, 90.2
See application file for complete search history.

(56) References Cited

FOREIGN PATENT DOCUMENTS

| JP | 03026825 A | * | 2/1991 |
|---|---|---|---|
| JP | 2734645 B2 | | 1/1998 |
| JP | 2000-130200 A | | 5/2000 |
| JP | 2002213245 A | * | 7/2002 |
| JP | 2003-239712 A | | 8/2003 |

* cited by examiner

*Primary Examiner*—Ching Chang
(74) *Attorney, Agent, or Firm*—Birch, Stewart, Kolash & Birch, LLP

(57) ABSTRACT

An intake control apparatus of an internal combustion engine including respective intake valves 5 opened when intake air reaching respective branch intake paths r1 from a main intake path Rim of the internal combustion engine is introduced to respective combustion chamber 2, and respective intake control valves 15 respectively arranged upstream from the intake valves on the respective branch intake paths for adjusting an intake introducing time period Tq for introducing intake air into the combustion chamber 2 in which both of the valves are brought into an opened state by controller 17.

8 Claims, 10 Drawing Sheets

AT LOW SPEED UNDER HIGH LOAD

AT MIDDLE SPEED UNDER HIGH LOAD

INTAKE CONTROL APPARATUS OF INTERNAL COMBUSTION ENGINE

BACKGROUND OF THE INVENTION

1. Field of the Invention

The present invention relates to an intake control apparatus of an internal combustion engine for controlling amounts of intake flowing to respective combustion chambers by intake control valves respectively provided on upstream sides of intake valves of respective cylinders on branch intake paths communicated with combustion chambers of the respective cylinders.

2. Description of the Related Art

In an engine which is an internal combustion engine mounted to an automobile, an intake path and an exhaust path communicated with a combustion chamber are opened and closed by an intake valve and an exhaust valve provided at a cylinder head. An intake amount of the engine is uniquely determined by an intake air amount adjusting unit of the intake path, for example, an opening degree of a throttle valve and a rotational speed of the engine.

On the other hand, there is known a phase variable apparatus of a cam shaft advance/delay adjusting type for adjusting to advance or delay a rotational phase of a cam shaft of a valve system in accordance with an operating state of an engine. In this case, by adjusting to advance or delay a valve timing of the intake valve, a valve overlap amount of the intake valve and the exhaust valve is controlled. Thus, an amount of air introduced to a combustion chamber, or an amount of exhaust gas temporarily exhausted from the combustion chamber and flowing back to remain in the combustion chamber, that is, an inner EGR amount is made to be proper to thereby achieve an improvement in an output of the engine, emission and fuel cost or the like. JP-A-2000-130200 discloses the phase variable apparatus of the cam shaft advance/delay adjusting type.

In place of the cam advance/delay adjusting type, there is known a phase variable apparatus of an actuator drive type using an electromagnetic actuator or a hydraulic actuator. The apparatus achieves an advantage of capable of ensuring a comparatively large degree of freedom of a phase variable control since the apparatus directly controls an opening/closing timing and an opening/closing time period of the valve.

In place of the phase variable apparatus, there is known an apparatus provided with electromagnetically controlled intake control valves on upstream sides of respective intake valves on respective intake branch paths. When a plurality of the intake control valves are used, as shown in FIG. 11, intake air is made to flow to a corresponding combustion chamber at a region E1 at which an opening/closing lift line Vs of the intake control valve overlaps opening/closing lift lines Ve, Vi of an intake valve and an exhaust valve. That is, when an intake amount to the combustion chamber is adjusted to be increased or decreased, by increasing or decreasing an interval of a valve opening timing t1 and a valve closing timing t2 of the intake control valve, an intake air amount can easily be adjusted to be increased or decreased without controlling to increase or decrease lift amounts of the intake and the exhaust valves. Japanese Patent No. 2734645 discloses an example of the phase variable apparatus of the intake control valve type.

Meanwhile, according to the phase variable apparatus of the cam shaft advance/delay adjusting type, a problem that an advance/delay adjusting width of the cam shaft is comparatively narrow is liable to be posed. According to the phase variable apparatus of the actuator drive type, a problem is liable to be posed in alleviation of impact in valve seating after lifting the valve and high speed following performance. According to the phase variable apparatus of a mechanical type, constituent members tend to be complicated, and a problem is liable to be posed in high speed following performance and ensuring of a mounting space in accordance therewith.

In the case of the apparatus having the plurality of intake control valves of Japanese Patent No. 2734645, electromagnetic actuators independent from each other are used for controlling to open or close the respective intake control valves, and response speeds of the respective intake control valves are determined by functions of the electromagnetic actuators. Further, the response speeds of the respective intake control valves are substantially constant in contrast to a rotational number of an internal combustion engine and therefore, when the rotational number of the internal combustion engine is increased, the response speed in correspondence with a crank angle is reduced. Therefore, when intake introducing timings are controlled by opening or closing the respective intake control valves, delays in response of the intake control valves are liable to be produced on a high rotation side of the internal combustion engine. When the electromagnetic actuator is changed to that of a high output, the response delay is improved and the high speed following performance is promoted, however, there poses a new problem that a space of installing a large-sized electromagnetic actuator needs to be found at inside of a narrow engine room.

According to the internal combustion engine having the phase variable apparatus, by an error in fabricating the respective apparatus or the response delay, a variation is present in the introduced intake amounts to the respective combustion chambers and a technical problem is posed in how to reduce the variation.

SUMMARY OF THE INVENTION

It is an object of the invention to provide an intake control apparatus of an internal combustion engine excellent in following performance when an intake introducing time period is increased and decreased by opening and closing a plurality of intake control valves.

In order to achieve the above-described object, an intake control apparatus of an internal combustion engine of the invention includes respective intake valves opened when intake air reaching a plurality of respective branch intake paths from a main intake path of the internal combustion engine is introduced to respective combustion chambers, and includes respective intake control valves respectively arranged upstream from the intake valves on the respective branch intake paths, and controller for adjusting an intake introducing time period in which both of the intake valves and the intake control valves for introducing intake air into the combustion chambers are brought into an opened state, wherein when the controller starts the intake introducing time period by one of the intake valve and the intake control valve, the controller finishes the intake introducing time period by other of the intake valve and the intake control valve.

Therefore, according to the intake control apparatus of an internal combustion engine of the invention, there is provided a constitution of two valves of the intake valves and the respective intake control valves arranged on the respective branch intake paths disposed upstream from the intake valves, the time period of introducing intake air introduced into the combustion chamber is started by one of the valves and finished by other of the valves by opening and closing the two valves and therefore, a requested controllability in increasing and decreasing the intake introducing time period can be satisfied.

BRIEF DESCRIPTION OF THE DRAWINGS

The nature of this invention, as well as other objects and advantages thereof, will be explained in the following with reference to the accompanying drawings, in which like reference characters designate the same or similar parts through out the figures and wherein.

DETAILED DESCRIPTION OF THE PREFERRED EMBODIMENTS

An embodiment of the invention will be explained with reference to the drawings.

Figure 1:
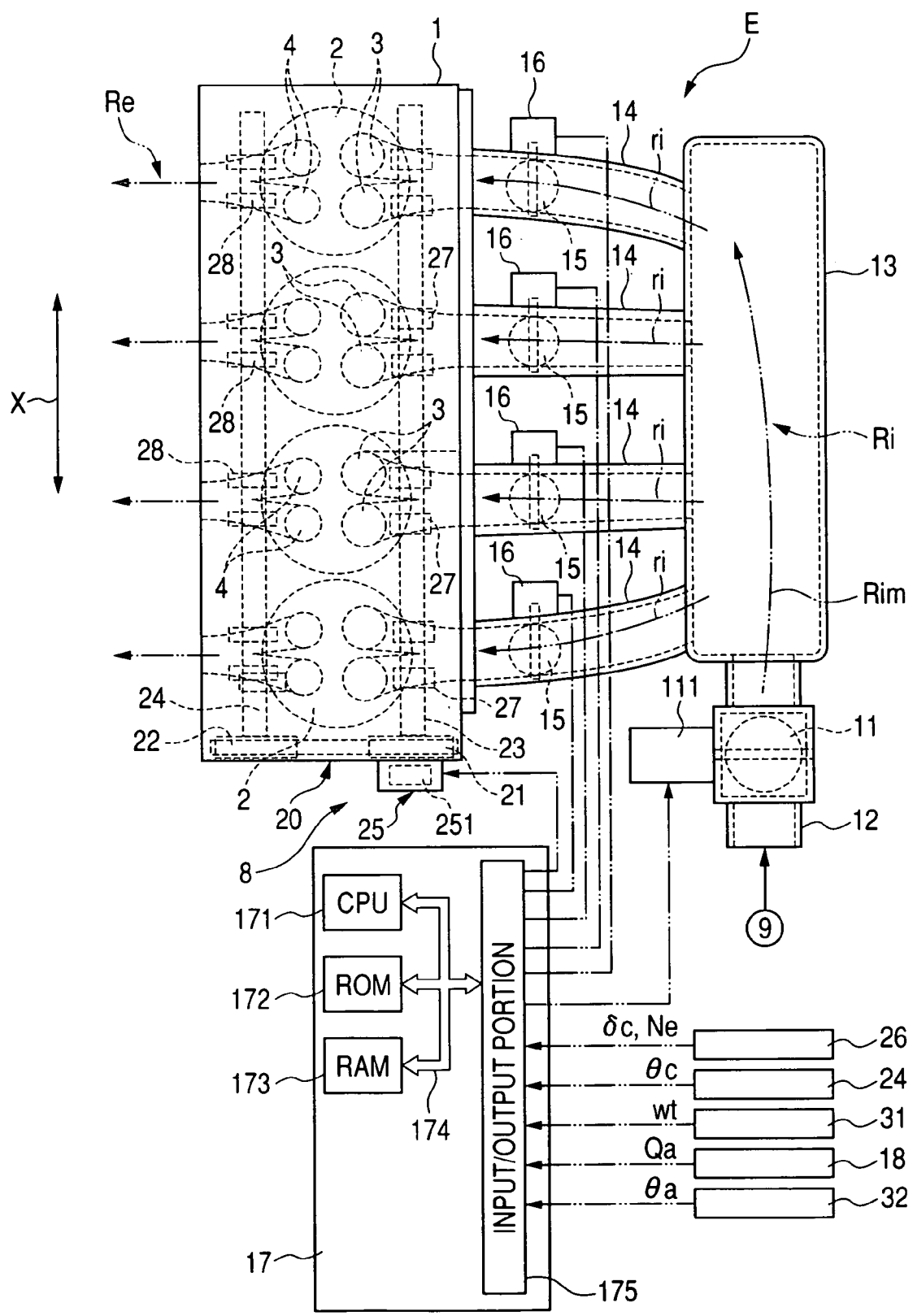
FIG. 1 is an overall view showing constitutions of an internal combustion engine and an intake control apparatus thereof according to an embodiment of the invention.
Figure 2:
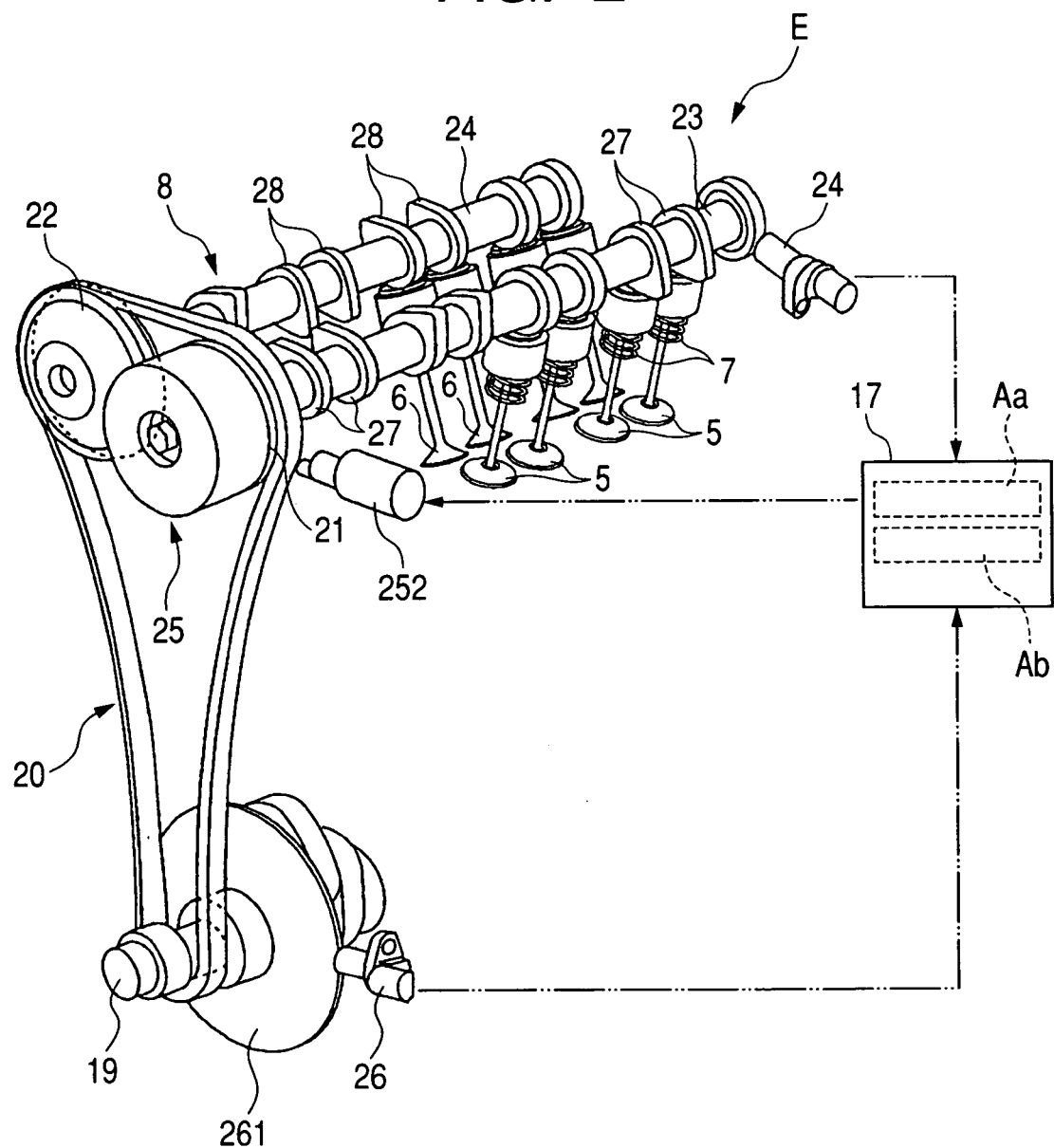
FIG. 2 is a perspective view of a valve system used in the internal combustion engine shown in FIG. 1.

FIG. 1 shows essential portions of an intake system and an exhaust system of a 4 cylinders reciprocal type gasoline engine (hereinafter, simply described as engine E) applied with an intake control apparatus of an internal combustion engine according to an embodiment of the invention, and FIG. 2 shows a valve system of the engine E. As shown in FIG. 1, a lower face of a cylinder head 1 of the engine E is overlapped with a cylinder block, not illustrated, to be fastened to each other to constitute an essential portion of an engine main body. The engine main body is successively formed with a plurality (for example, 4) of combustion chambers 2 along a longitudinal direction X (up and down direction in FIG. 1) of the cylinder head 1. Each combustion chamber 2 is provided with respective pairs of intake ports 3 continuous to an intake path Ri and exhaust ports 4 continuous to an exhaust path Re. Further, an upper portion of the cylinder head 1 is respectively equipped with pairs of intake valves 5 (refer to FIG. 2) for opening and closing the pairs of intake ports 3 and pairs of exhaust valves 6 (refer to FIG. 2) for opening and closing the pairs of exhaust ports 4. The plurality of intake valves 5 and the plurality of exhaust valve 6 are respectively mounted with valve springs 7 for urging the respective valves in a closing direction. An upper portion of the cylinder head 1 is mounted with a phase variable valve system 8 as a valve system of a DOHC type for driving the plurality of intake valves 5 and the plurality of exhaust valves 6.

The exhaust path Re guides exhaust gas of the combustion chambers 2 of the respective cylinders from the exhaust ports 4 to respective branch exhaust paths re on a side of an exhaust manifold, not illustrated, when the exhaust valves 6 are opened and makes the exhaust gas flow out to an atmospheric opening side by way of an exhaust pipe, not illustrated, on a further downstream side.

The intake path Ri is for making air from an air cleaner 9 flow into the respective cylinders of the engine main body and is constituted by an intake pipe 12 constituting a main intake path Rim, a surge tank 13 on a downstream side of the main intake path Rim, a plurality of intake branch pipes 14 forming branch intake paths ri branched to be extended from the surge tank 13, and the intake ports 3 formed at inside of the cylinder head 1 to communicate with the respective branch intake paths ri and communicated with the respective combustion chambers 2 when the intake valves 5 of the respective cylinders are opened.

The main intake path Rim is arranged with a throttle valve 11 of an electronic control type for opening and closing the intake path, and the respective branch intake pipes 14 are respectively arranged with intake control valves 15 for opening and closing the respective intake branch pipes 14. Vicinities of the respective intake branch pipes 14 are arranged with electromagnetic solenoid actuators 16 (hereinafter, referred to as 'solenoid 16') as an opening/closing driving unit for driving to open and close the respective intake control valves 15 independently from each other. The intake control valves 15 are of a butterfly type and arranged to be able to open and close the branch intake paths ri between joining portions of the pairs of the intake branch pipes 14 of the respective cylinders and the surge tank 13. A rotating shaft of each intake control valve 15 is connected to the solenoid 16 by way of a link system, not illustrated. The solenoid 16 is for switching a valve opening timing Bot and a valve closing timing Bct of the intake control valve 15, mentioned later.

A throttle actuator 111 as a throttle opening/closing driving unit for driving to open and close the throttle valve 11 arranged on the main intake path Rim and the solenoid 16 for driving to open and close the intake control valve 15 as shown in FIG. 1 are connected to an input/output portion 175 of a controller 17 as shown in FIG. 1. The throttle actuator 111 maintains to fully open the throttle valve 11 in a state of not being applied with a current and the solenoid actuator 16 maintains to fully close the intake control valve 15 in a state of not being applied with a current. When the throttle actuator 111 is applied with a predetermined duty ratio of current, a valve shaft is pivoted by way of a link system, not illustrated, and the throttle valve 11 is adjusted to a pertinent opening degree, that is, a pertinent intake air amount. When the solenoid 16 is applied with a current, during the time period, the intake control valve 15 is maintained to be fully opened.

Respective rotating shafts of the throttle valve 11 and the plurality of intake control valves 15 are mounted with valve opening degree sensors, not illustrated, and a throttle opening degree signal and intake control valve opening degree signals issued therefrom are inputted to the controller 17. The intake pipe 12 is mounted with an air flow sensor 18 for detecting an intake air amount Qa and a signal of the intake air amount Qa from the air flow sensor 18 is inputted to the controller 17.

As shown in FIG. 2, the phase variable valve apparatus 8 as the valve system is formed such that a half rotation of a crank shaft 19 on an engine main body side is received by intake and exhaust cam sprockets 21, 22 by way of a belt rotation transmitting unit 20. The intake cam shaft 23 receives rotation of the intake cam sprocket 21 through a phase variable driving unit (VVT) 25 and the exhaust cam shaft 24 is driven to rotate as it is by the exhaust cam sprocket 22.

Positions of the intake cam shaft 23 and the exhaust cam shaft 24 opposed to the combustion chambers 2 of the respective cylinders are integrally attached with pairs of intake cams 27 and pairs of exhaust cams 28 for driving the pairs of intake valves 5, the pairs of exhaust valves 6, thereby, the plurality of intake valves 5 and the plurality of exhaust valves 6 are driven to open and close.

The phase variable driving unit (VVT) 25 is provided with a rotation type actuator 251 of, for example, an electromagnetic drive type, and the rotation type actuator 251 is driven to switch to control to switch a phase by receiving a phase control signal from an intake valve variable adjusting portion Ab (refer to FIG. 2) constituting one of control functions of the controller 17 by a control valve 252 communicated with a switch driving portion (not illustrated) at inside thereof.

The controller 17 achieves particularly functions as an intake control valve opening/closing portion Aa and the intake valve variable adjusting portion Ab in addition to an engine control function as a logical operation circuit centering on CPU 171, ROM 172, RAM 173 and is connected to an input/output portion 175 by way of a common bus 174 to input and output to and from outside.

The input/output portion 175 is connected with a crank angle sensor 26 for inputting information of a unit crank angle δc and an engine rotational number Ne, a cam angle sensor 24 for inputting a cam angle signal θc, a water temperature sensor 31 for inputting an engine cooling water temperature wt, the air flow sensor 18 for inputting the intake air amount Qa, an accelerator opening degree sensor 32 for inputting an accelerator opening degree θa and the like and detecting signals from the respective sensors and signals from respective controller are inputted from the input/output portion 175 to CPU 171. CPU 171 outputs control signals to the throttle actuator 111, the solenoid 16, the rotation type actuator 251 by way of the input/output portion 175.

Figure 3A:
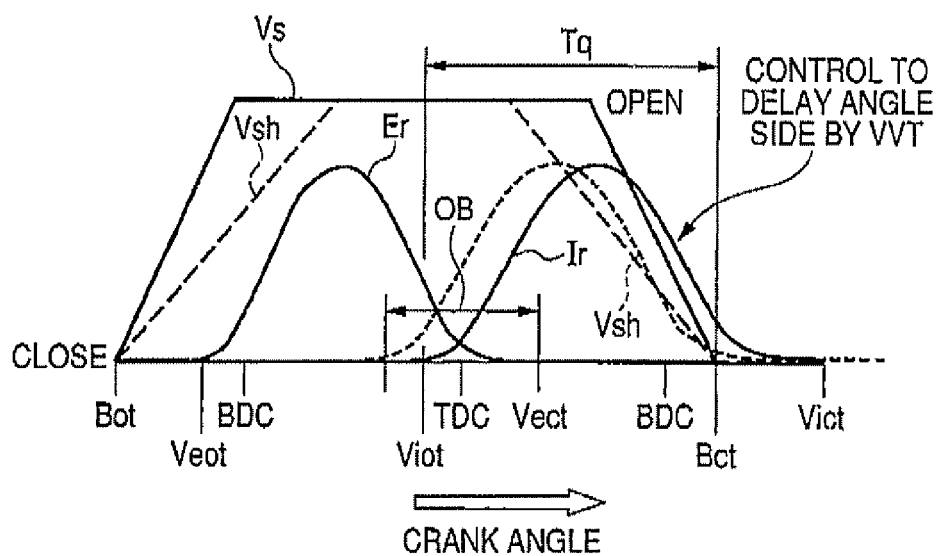
FIGS. 3A and 3B illustrate explanatory diagrams showing lift characteristics of an intake valve and an intake control valve controlled by the intake control apparatus of the internal combustion engine.
Figure 3B:
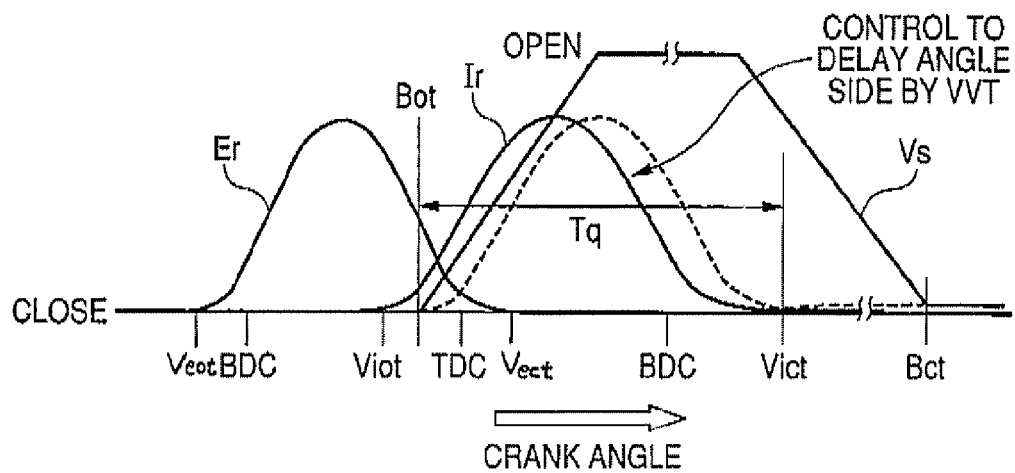

FIGS. 3A and 3B illustrate diagrams showing operation of the intake valve 5, the exhaust valve 6 and the intake control valve 15. FIG. 3A shows operation at low speed and under high load, and FIG. 3B shows operation at middle speed and under high load. The intake control valve 15 is normally brought into a valve closing state and opens the branch intake path ri in driving as is apparent from a lift line Vs thereof. In FIGS. 3A and 3B, notation Er designates a lift line of the exhaust valve 6 and notation Ir designates a lift line of the intake valve 5, respectively. In FIGS. 3A and 3B, notation Bot designates a valve opening timing of the intake control valve 15, and notation Bct designates a valve closing timing of the intake control valve 15. Notation Viot designates a valve opening timing of the intake valve 5, and notation Vict designates a valve closing timing of the intake valve 5, respectively. Notation Veot designates a valve opening timing of the exhaust valve 5, and notation Vect designates a valve closing timing of the exhaust valve 5, respectively. Notation Tq designates an intake introducing time period.

In FIG. 3A, the intake introducing time period Tq is constituted by from the valve opening timing Viot of each intake valve 5 to the valve closing timing Bct of the intake control valve 15. In FIG. 3B, the intake introducing time period Tq is constituted by from the valve opening timing Bot of each intake control valve 15 to the valve closing timing Vict of the intake valve 5. Intake air flows into each combustion chamber 2 only in the intake introducing time period Tq. Thereby, the intake air amount Qa can be adjusted by controlling to increase and decrease the intake introducing time period Tq.

A characteristic of the embodiment resides in that the solenoid 16 is controlled to be driven and the rotation type actuator 251 is controlled to be driven in accordance with a load situation of the engine E and the intake air amount Qa introduced into each combustion chamber 2 is controlled by adjusting intake introducing time period Tq.

That is, when a situation of operating the engine E is at low speed and under high load, as shown in FIG. 3A, the controller 17 controls the solenoid 16 such that the intake control valve 15 is opened on an advance side of the valve opening timing Viot of the intake valve 5 opened by the phase variable driving unit (VVT) 25 and the intake control valve 15 is closed on an advance side of the valve closing timing Vict of the intake valve 15 closed by the phase variable driving unit 25. Further, when the state of operating the engine E is under high load and at middle rotation, the controller 17 controls the solenoid 16 such that the intake control valve 15 is opened on a delay side of the valve opening timing Viot of the intake valve 5 opened by the phase variable driving unit 25 and the intake control valve 15 is closed on a delay side of the valve closing timing Vict of the intake valve 5 closed by the phase variable driving unit 25.

According to the embodiment, the phase variable driving unit 25 shifts a phase by the rotation type actuator 251 from the valve opening timing Viot to the valve closing timing Vict which are timings of opening and closing each intake valve 5 to advance side and delay side relative to the crank angle.

By controlling to switch the phase, the valve opening timing (refer to FIGS. 3A and 3B) Viot in operating to lift the intake valve 5 is adjusted to move to delay side or the advance side. In controlling by the phase variable driving unit 25, a phase of rotating the intake cam shaft 23 is detected by the cam angle sensor 24 (refer to FIG. 2) and is outputted to the controller 17. Further, a side of the crank shaft 19 is integrally coupled with a crank side rotor 261, which is opposedly provided with the crank angle sensor 26, thereby, the unit crank angle signal δc is detected and output to the controller 17.

According to the embodiment, the controller 17 controls the rotation type actuator 251 such that the higher the rotational speed of the engine E, to the more advance side the valve opening timing Viot of each intake valve 5 is controlled by the phase variable driving unit 25.

An explanation will be given of a method of controlling the intake system and the valve system in driving the engine E in this way. According to the controller 17, the throttle actuator 111 is inputted with an output of an opening degree in correspondence with the accelerator opening degree θa based on the input signal θa of the accelerator opening degree sensor 32, a fuel supply amount is determined based on the intake air amount Qa and the engine rotational speed Ne, a fuel valve and an ignition system, not illustrated, are driven, and the engine E continues to be driven.

At this occasion, the intake valve phase variable adjusting portion Ab of the controller 17 calculates the valve opening timing Viot which is a target phase shifting angle of the intake valve 5 based on information of the intake air amount Qa and the engine rotational speed Ne which are read amounts in correspondence with the load as well as the engine cooling water temperature wt and the like for setting other correction values.

For example, when a current operating region is a middle load operating region from operating information from the intake air amount Qa and the engine rotational speed Ne or the like, the valve opening timing of the intake valve 5 is calculated as a value Viotb in correspondence with a reference delay value. In contrast thereto, when the engine E is brought into a low load operating region including that in idling, the valve opening timing Viot of the intake valve 5 is calculated as a most delay value Viotr. Therefore, the lift line Ir shown in FIG. 3A is moved from a broken line position to a bold line position, and a valve overlap amount OB becomes small or null. On the other hand, when the engine E is on the high load side, the valve opening timing Viots of the intake valve 5 is corrected to the advance side, in this case, therefore, the lift line Ir shown in FIG. 3B is moved from the broken line position to the bold line position to make the valve overlap amount OB a maximum value.

The intake valve phase variable adjusting portion Ab of the controller 17 calculates the target valve opening timing Viot adapted to the intake air amount Qa and the engine rotational speed Ne of amounts in correspondence with the load from time to time by the valve opening timing Viot, operates the phase variable driving unit (VVT) 25 in accordance with the control signal and operates to open the intake valve 5 at the valve opening timing Viot.

In contrast thereto, the valve opening timing Bot and the valve closing timing Bct of the intake control valve 15 on the upstream side of the intake valve 5 are controlled in accordance with a state of operating the engine E. That is, when the state of operating the engine E is at low speed and under high load, as shown in FIG. 3A, the controller 17 controls the solenoid 16 such that the intake control valve 15 is opened on the advance side of the valve opening timing Viot of the intake valve 5 and the intake control valve 15 is closed on the advance side of the valve closing timing Vict of the intake control valve 15. Therefore, in the case of low speed and high load, introduction of intake air is started by a cam profile of the intake cam 27 by previously opening fully the intake control valve 15 and introduction of intake air is cut by closing the intake control valve 15 during a time period of opening the intake valve 5.

For example, when the state of operating the engine E is under high load and at middle rotation, as shown in FIG. 3B, the controller 17 controls the solenoid 16 such that the intake control valve 15 is opened on the delay side of the valve opening timing Viot of the intake valve 15 and the intake control valve 15 is closed on the delay side of the valve closing timing Vict of the intake valve 15. Therefore, intake air is introduced by operating the intake control valve 15 in which an operating speed remains unchanged in a time axis, and introduction of intake air is cut by closing the intake valve 5 by the cam profile of the intake cam 27 in which operation is accelerated on the time axis in accordance with an increase in rotation of the engine E. Further, when the state of operating the engine E is under high load and at high rotation, the intake air introducing time period may be adjusted by the phase variable driving unit 25 by bringing the intake control valve 15 into a normally valve opening state. In this case, high speed response of the intake control valve 15 needs not be promoted more than necessary.

The intake introducing time period Tq is adjusted in accordance with the state of operating the engine E by using the respective intake control valves 15 arranged respectively on the respective branch intake paths 14 disposed upstream from the respective intake valves 5 in this way, the respective solenoids 16 for opening and closing the respective intake control valves 15 independently from each other, and the phase variable driving unit 25 for shifting phases of timings of opening and closing the respective intake valves 5 and therefore, high speed following performance in adjusting the intake introducing time period Tq, that is, the intake air amount Qa can be achieved without making the respective intake control valves 15 large-sized.

Figure 4:
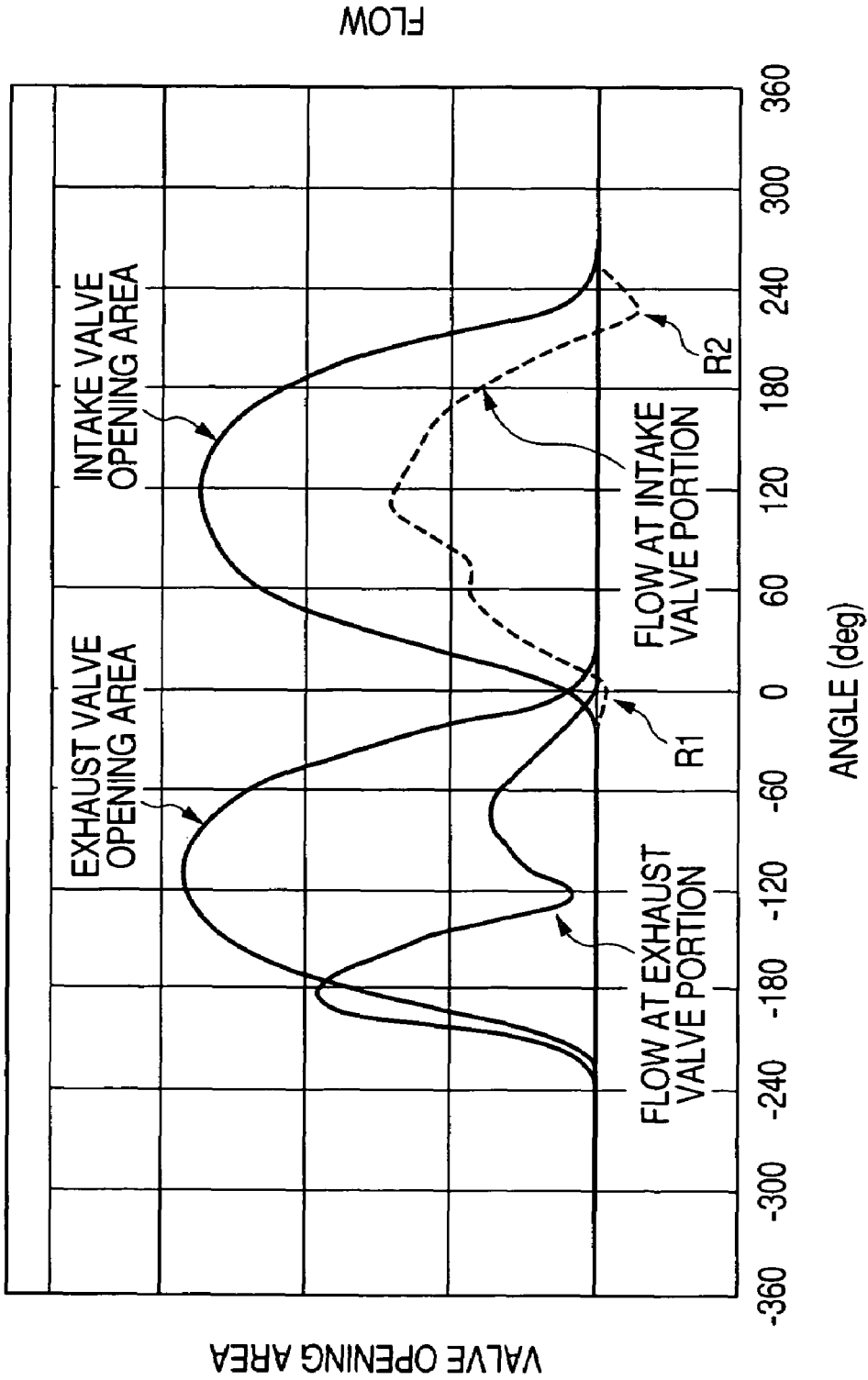
FIG. 4 is a characteristic diagram showing variations in pressures of respective valve portions and flow rates of intake and exhaust flowing in pipes in accordance with operation of opening and closing the intake valve and an exhaust valve.

FIG. 4 shows flows of exhaust and intake by opening and closing the intake valve 5 and the exhaust valve 6, that is, air flow rates. As is apparent from FIG. 4, at a valve opening timing and a valve closing timing of the intake valve 5, as indicated by notations R1, R2, the intake air amount becomes negative, the phenomenon is brought about by blowing back intake air. According to the embodiment, intake air is cut by closing the intake valve 5 by the intake cam 27 for accelerating the operation in accordance with the increase in rotation of the engine E without using the intake control valve 15 in which an increase in response speed cannot be desired and therefore, a charging efficiency is promoted by adding intake air more swiftly than in cutting intake air by the intake control valve 15. Thereby, the charging efficiency of intake air is increased while achieving high speed following performance in increasing or decreasing the intake introducing time period Tq and even in a case of changing the operating region of the internal combustion engine, the case can sufficiently be dealt with.

Figure 5:
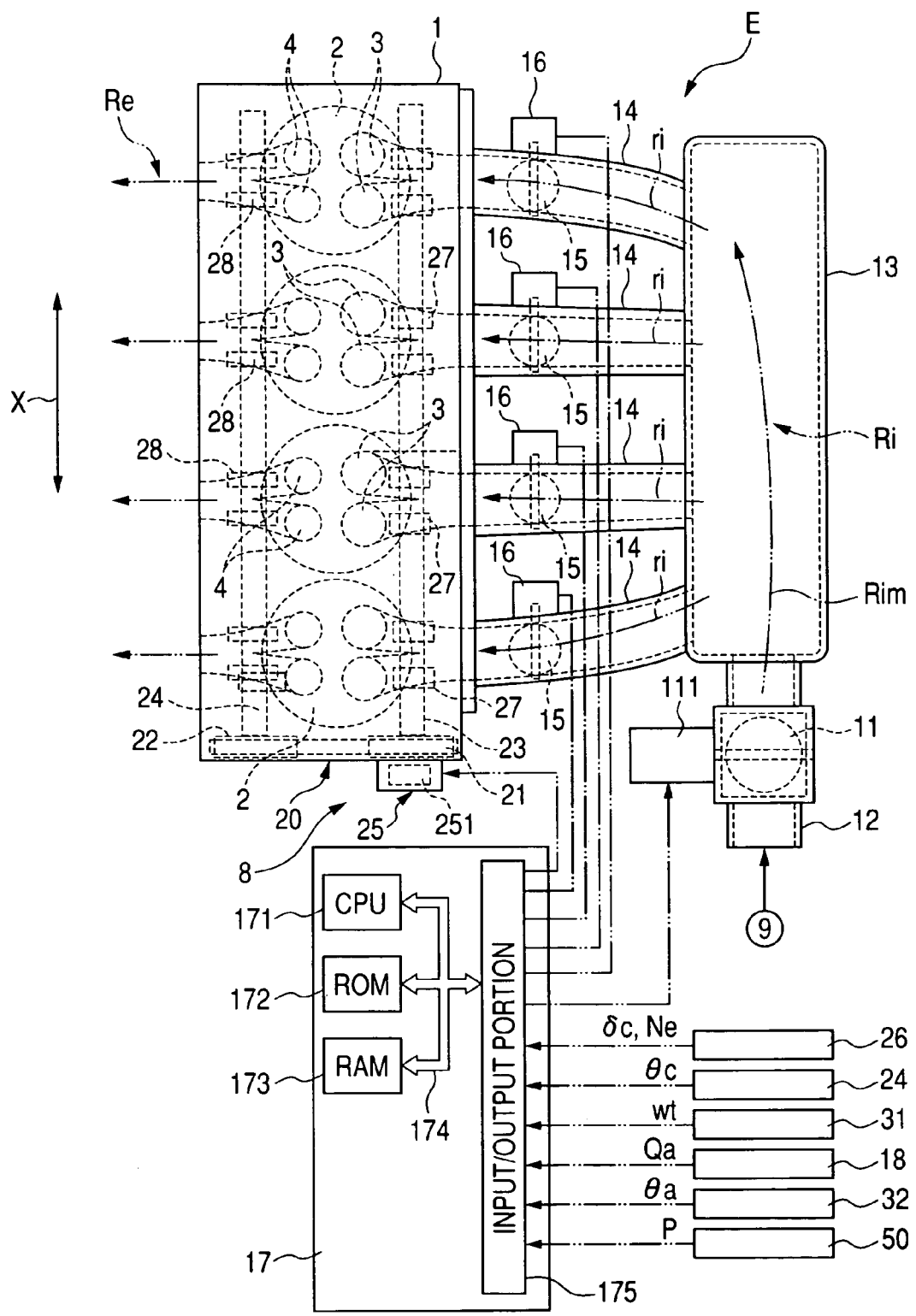
FIG. 5 is an overall view showing constitutions of an internal combustion engine and an intake control apparatus thereof according to another embodiment of the invention.

FIG. 5 shows another embodiment of the invention. In this embodiment, the intake control apparatus of the internal combustion engine shown in FIG. 1 is respectively added with pressure sensors 50 as pressure detecting units for detecting pressures in the respective branch intake paths 14 on intake downstream sides of the respective intake control valves 15 to output to the controller 17 for adjusting the opening degrees of the respective intake control valves 15 and the throttle valve 11 in accordance with signals from the pressure sensors 50.

That is, according to the controller 17 used in the embodiment, along with the above-described intake control, detecting information P from the pressure sensor 50 and a previously set value P2 are compared, and when the detecting information P exceeds the set value P2, the opening degrees of the intake control valve 15 and the throttle valve 11 are corrected by way of the solenoid 16 such that detecting information P becomes smaller than the set value P2.

ROM 172 of the controller 17 is previously stored with a correcting map for correcting the target pressure values P1, the set values P2, the opening degrees of the respective intake control valves 15 at insides of the respective branch intake paths 14 at vicinities of the pressure sensors 50. The target pressure value P1 is stored as map information calculated from the accelerator opening degree and the engine rotational number Ne and is pertinently read in accordance with the accelerator opening degree and the engine rotational number Ne and updated. The set value P2 is a value for determining whether the opening degrees of the respective intake control valves 15 are corrected.

According to the embodiment, the controller 17 adjusts the opening degrees of the respective intake control valves 15 by controlling the solenoids 16 when the engine E is at low rotation and adjust the opening degree of the throttle valve 11 by controlling the throttle actuator 111 when the engine E is at high rotation.

Figure 6:
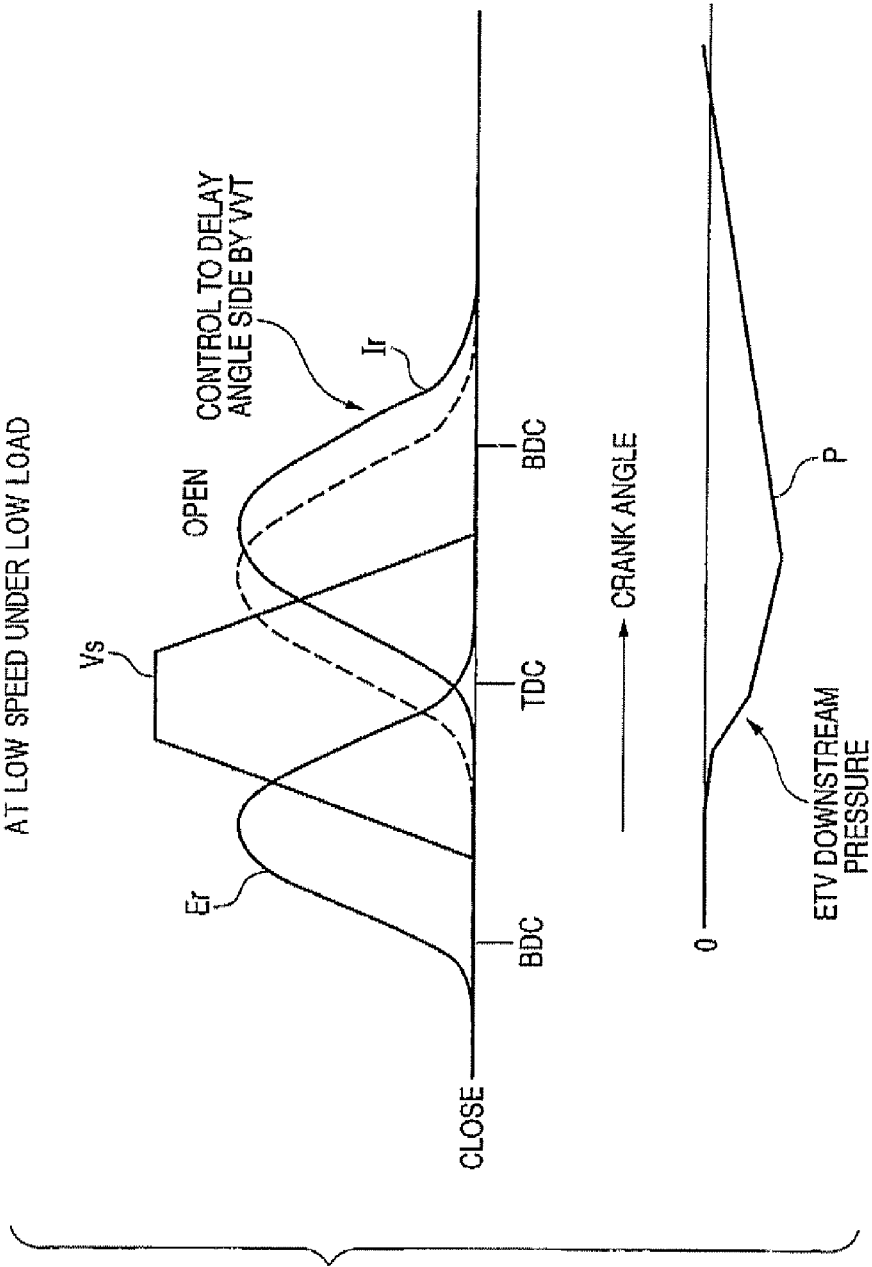
FIG. 6 is an explanatory diagram showing a pressure variation on a downstream side of the intake control valve in accordance with operation of opening and closing the intake valve and the exhaust valve and the intake control valve.

FIG. 6 is a diagram showing variations of the pressures (EVT downstream pressures) at insides of the respective branch intake paths 14 downstream from the respective intake control valves 15 at low speed and under low load. In the drawing, notation Er designates the lift line of the exhaust valve 6, notation Ir designates the lift line of the intake valve 5, and notation Vs designates an opening/closing lift line of the intake control valve 15, respectively. As is apparent from the diagram, when the intake valve 5 is opened, the pressure (EVT downstream pressure) of each branch intake path 14 is rapidly reduced and a variation is produced in an amount of the reduction.

Next, an explanation will be given of a control mode based on the detecting signal from the pressure sensor 50 with reference to a flowchart shown in FIG. 7. Incidentally, an explanation will be given by assuming that the engine E has already been started at steps of FIG. 7.

Figure 7:
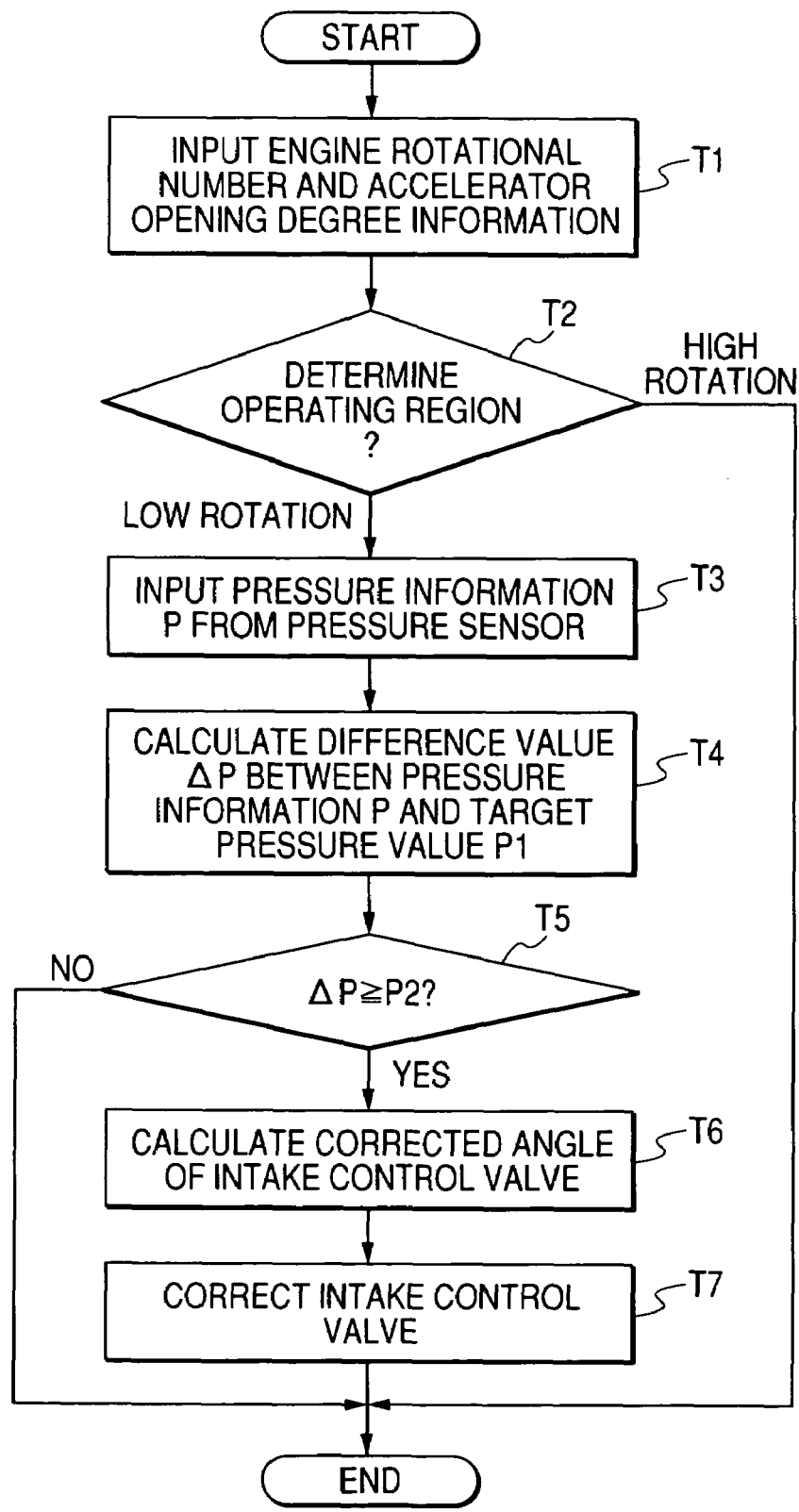
FIG. 7 is a flowchart showing a control mode for correcting a variation in an intake pressure.

At step T1 of FIG. 7, the engine rotational number and accelerator opening degree information or the like are inputted, and at step T2, a state of operating the engine E is determined. Further, when the state of the engine is brought into a region of low rotation, the operation proceeds to step T3, inputs the detecting information P from the respective pressure sensors 50 and proceeds to step T4. At step T4, from the inputted detecting information (pressure information) P and the inputted target pressure value P1, a difference therebetween is calculated and the operation proceeds to step T5.

At step T5, the calculated difference value PΔ and the set value P2 are compared, when the difference value PΔ is smaller than the set value P2, it is determined that the opening degree needs not to be corrected by regarding the variation in the introduced intake amount as in an allowable range and the control is finished. When the difference value PΔ reaches the set value P2, it is determined that a variation in the introduced intake amount exceeds allowable range and the opening degree needs to be corrected and the operation proceeds to step T6.

At step T6, the opening degree of the intake control valve 15 is calculated from a map, not illustrated, such that the difference value PΔ becomes smaller than the set value P2, at step T7, the opening degree of the intake control valve 15 is adjusted based on the value.

Therefore, the variations in air amounts introduced to the respective combustion chambers 2 can be reduced while achieving the high speed following performance in increasing and decreasing the intake introducing time period Tq and the function and the fuel cost can be promoted.

Although according to the embodiment, the control for correcting the variations in the intake air amounts is carried out by controlling to open and close the respective intake control valves 15 at low rotation at which the operation (idling) of the engine E is liable to be unstable by a reduction in the pressure, such a control may be carried out by a mode of pertinently correcting the intake air amount based on the detecting information from the pressure sensor 50 without limiting a state of operating and a region of operating the engine. Further, as an object of control, the variation may be adjusted by controlling not the respective intake control valves 15 but the opening degree of the throttle valve 11.

Although according to the above-described embodiment, start of the intake introducing time period is selectively set by the phase variable driving unit (VVT) 25 and the respective intake control valves 15 in accordance with the engine rotational number, the intake introducing time period may always be started by the phase variable driving unit (VVT) 25.

Figure 8:
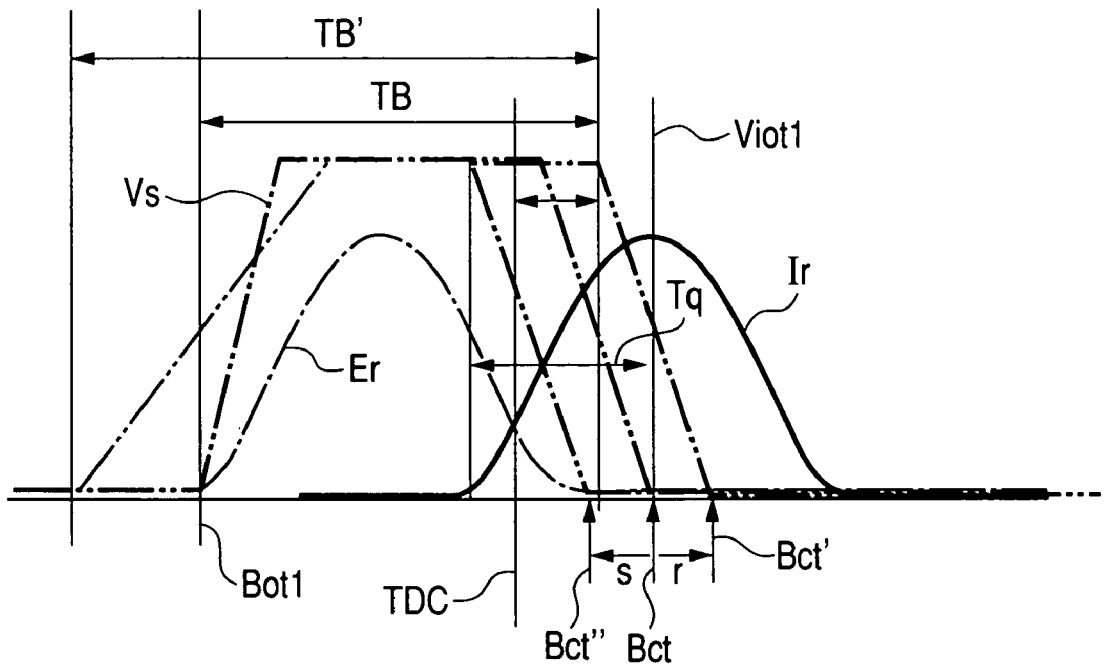
FIG. 8 is an explanatory diagram showing lift characteristics of an intake valve and an intake control valve according to other embodiment controlled by an intake control apparatus of an internal combustion engine.
Figure 9:
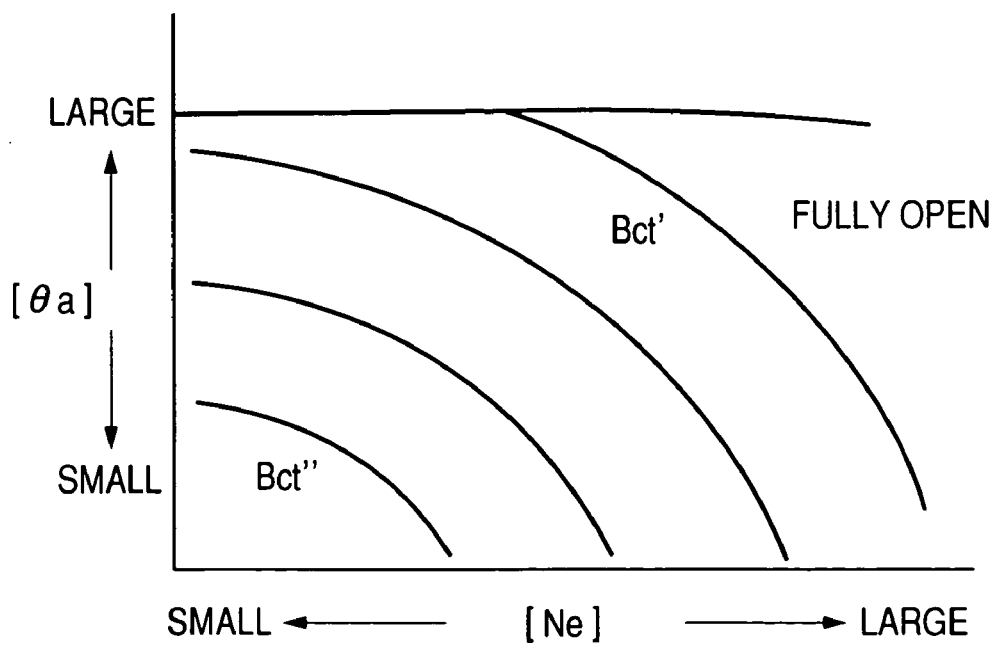
FIG. 9 is a characteristic line diagram of a map for setting an advance/delay control amount of the intake control valve.

As shown in FIG. 8, only the valve opening timing Bot of the intake control valve 15 is maintained constant and the valve closing timing Bct of the intake control valve 15 is controlled to be advanced or delayed in accordance with the rotational speed Ne of the internal combustion engine. A valve closing timing set map as shown in FIG. 9 is adopted. Here, the larger the engine rotational number Ne at low rotation, the more delayed (r) is the valve closing timing Bct of the intake control valve 15 toward the side of the valve closing timing of the intake valve 5 and is corrected up to a maximum delayed angle value Bct' (refer to FIG. 8). Conversely, at an idling rotational number Nea or smaller, the valve closing timing of the intake control valve 15 is set to be the most advanced as Bct".

Incidentally, the valve closing timing Bct' (refer to FIG. 8) of the most delayed angle side in this case is set to a vicinity of a timing Viotl of fully opening the intake valve 5. This is because when the region of operating the engine is brought into a high load region, a control of the valve opening timing Bot of the intake control valve 15 is interrupted, the intake control valve 15 is set to be fixed to be fully open, intake loss is restrained, and the engine is operated by giving priority to an output thereof.

Figure 10:
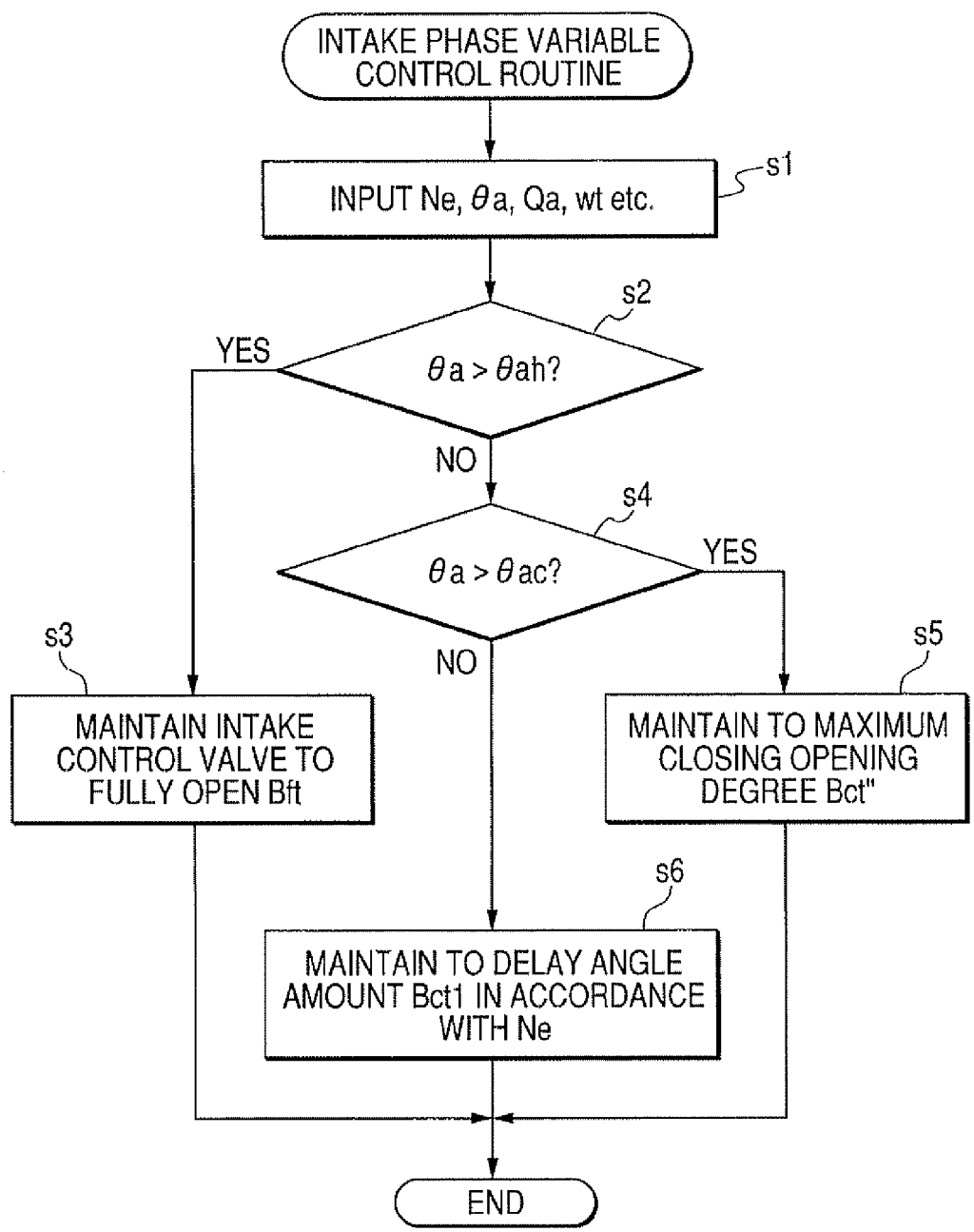
FIG. 10 is a control flowchart of other embodiment.
Figure 11:
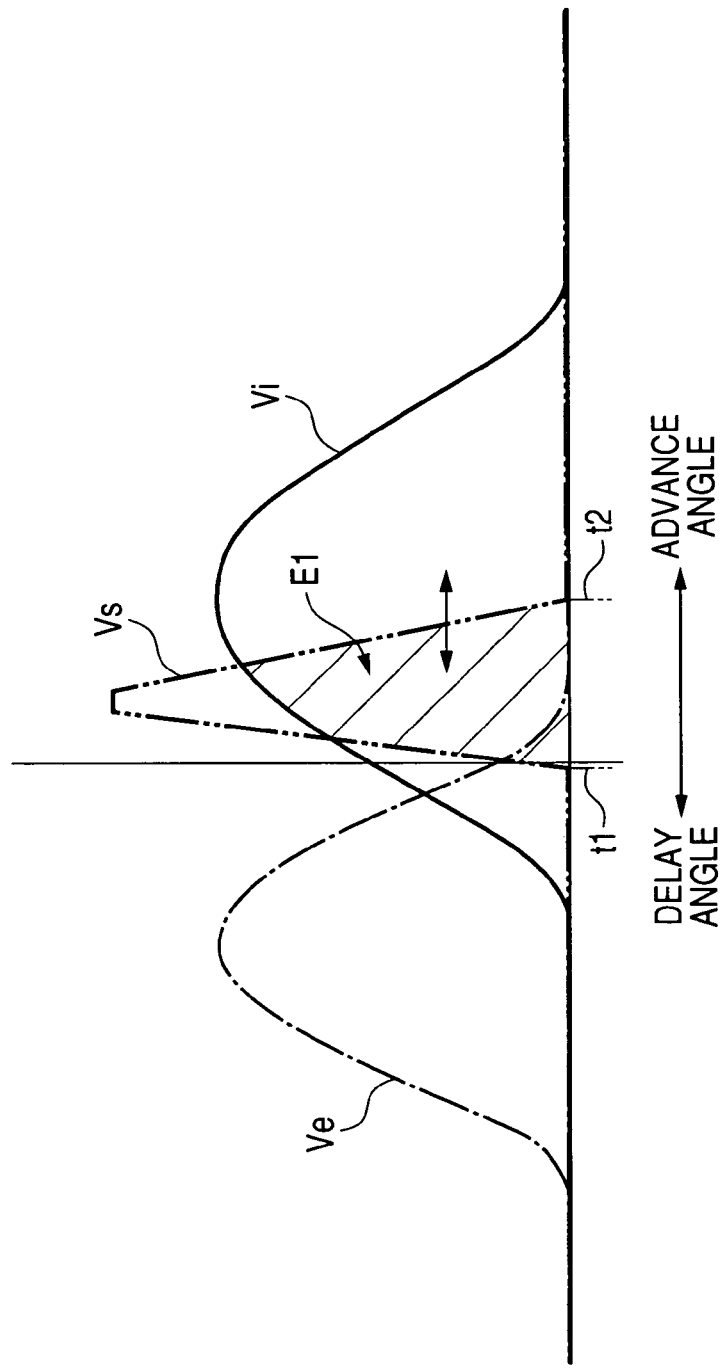
FIG. 11 is a diagram of valve lift lines of intake and exhaust valves according to an intake control apparatus of an internal combustion engine of a related art.

Next, an explanation will be given in accordance with an intake phase control processing routine of FIG. 10.

Incidentally, timings of opening and closing the intake valve are separately controlled to be switched to be advanced and delayed by operating the phase variable driving unit (VVT) 25, from operating information of the intake air amount Qa and the engine rotational speed Ne or the like, the timings are controlled to be adjusted between most delayed timing Viotr and the most advanced timing Viots centering on a valve opening timing Viotb which is a reference delayed angle value.

The controller 17 reaches step s1 of the intake phase control processing routine in the midst of a main routine for controlling the engine. Here, the engine rotational number Ne, the accelerator opening degree θa, the intake air amount Qa, the cooling water temperature wt and the like constituting engine operating information are inputted and processed to be stored. At step s2, it is determined whether the accelerator opening degree θa constituting current load information exceeds a high load determinant θah, when exceeded, the operation proceeds to step s3, here, the intake control valve 15 is fixed to a fully open opening degree and the control at this time is finished.

At a low or middle load region in which the accelerator opening degree θa is smaller than the high load determinant θah, the operation proceeds to step s4, here, it is determined whether the accelerator opening degree θa is smaller than a fully closed determinant θac, when smaller, the operation proceeds to step s5, the intake control valve 15 is set to the maximum closing timing Bct" (refer to FIG. 8) and the control at this time is finished.

When the accelerator opening degree θa becomes larger than the fully closed determinant θac, the operation proceeds to step s6, here, the delayed angle calculating map of FIG. 9 is used, and the more increased the engine rotational speed Ne from the side of Nea (for example, in idling), the more increased the delayed angle value toward the side of the valve closing timing Bct' constituting the side of the valve closing timing (refer to FIG. 9) of the intake valve 5 is set to the side of the valve closing timing Bct of the intake control valve 15, which is on the Vict side. That is, the intake introducing time period Tq between the valve opening timing Viot of the intake valve 5 and the valve closing timing Bct, mentioned later, of the intake control valve 15 is enlarged, the intake air amount Qa to the combustion chamber 2 is made to be increased, and the control at this time is finished.

Therefore, the intake introducing time period Tq in correspondence with the intake air amount Qa supplied to the combustion chamber 2 of each cylinder is determined by the valve opening timing Viot of the intake valve 5 and the valve closing timing Bct of the intake control valve 15 and therefore, even when the intake introducing time period Tq determined by information of operating the engine E is comparatively narrow, in operating to open and close, the intake control valve 15 is fully opened prior to opening the intake valve 5, thereafter, the intake valve is opened, and successively, after elapse of the intake introducing time period Tq, the intake control valve 15 is operated to be closed (Bct). Therefore, even when a response of opening and closing the intake control valve 15 per se is low, a time interval TB of operating to open and close the intake control valve 15 can be set to be comparatively long, a failure in operating the intake control valve 15 by the excessively narrow time interval TB (interval of operating to open and close) can be prevented, reliability of intake amount control is improved, a request value in promoting response can be made to be low and an increase in cost of the intake control valve can be prevented.

That is, although the lower the engine rotational speed Ne, the more proximate the valve closing timing Bct of the intake control valve 15 to the valve opening timing Bot, the valve opening timing Bot is set to be prior to the valve opening timing Viot of the intake valve. Therefore, the intake control valve 15 reaches the valve closing timing Bct after a sufficient elapse time period from operating the intake control valve 15 at the valve opening timing Bot, and by operating to close the intake control valve 15 at the valve closing timing Bct, operation of opening and closing the intake control valve 15 is stabilized, and operational reliability can be ensured. Further, the operational reliability can be ensured even by setting to decelerate the speed of operating to open the valve.

Further, the intake air amount Qa can be adjusted in accordance with the operating state by a wider control width while reducing intake resistance by the throttle valve 11 (air amount adjusting valve) of the main intake path Rim, and also a control characteristic of engine brake or the like can be improved by operating to throttle both of the throttle valve 11 and the intake control valve 15. Further, even when the respective intake control valves are failed, the throttle valve can be used as a failsafe mechanism.

Further, by controlling to advance and delay a rotational angle of the intake cam shaft 23 by the phase variable driving apparatus (VVT) 25, the valve opening timing of the intake cam 23 can be adjusted to be advanced and delayed, that is, the side of the valve opening timing Viot of the intake introducing time period Tq can easily be adjusted to be advanced and delayed and the control of increasing or decreasing the intake introducing time period Tq is facilitated in this respect.

Further, the larger the load of the engine E, the more increased is the intake introducing time period Tq, that is, the intake air amount Qa, particularly under high load, the intake control valve 15 is fixed to the fully open opening degree and therefore, the charging efficiency is increased and the reduction in the output by mounting the intake control apparatus can be prevented.

Further, the larger the rotational speed Ne of the engine E, the more advanced is the valve opening timing of the intake control valve 15, that is, at the earlier timing, the valve is opened and therefore, even when the rotational speed Ne of the engine E is increased, a time interval of operating to open and operating to close the intake control valve 15 becomes comparatively long, a failure in operation can be prevented and reliability of the control is improved.

Although in the above-described embodiments, the engine E is provided with the phase variable driving unit (VVT) 25 only at the intake cam shaft, the invention may be applied to an engine adopting a constitution of mounting phase variable driving unit (VVT) also to a side of the exhaust cam shaft in addition thereto, carrying out a phase variable control of the intake and exhaust cam shafts and increasing a degree of freedom in overlap control, also in this case, operation and effect similar to those of the intake control apparatus of the internal combustion engine of FIG. 1, FIG. 5 can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake control apparatus of an internal combustion engine, comprising:
 a plurality of intake valves opened when intake air reaching a plurality of branch intake paths from a main intake path (Rim) of the internal combustion engine is introduced to respective combustion chambers;
 a plurality of intake control valves respectively arranged upstream from the intake valves on the respective branch intake paths; and
 a controller for adjusting an intake introducing time period in which both of the intake valve and the intake control valve for introducing intake air into the combustion chamber are brought into an opened state,
 wherein when the controller starts the intake introducing time period by one of the intake valve and the intake control valve, the controller finishes the intake introducing time period by other of the intake valve and the intake control valve.

2. The intake control apparatus of an internal combustion engine according to claim 1, further comprising:
 an opening/closing driving unit for opening and closing the respective intake control valves respectively independently from each other; and
 a phase variable driving unit for shifting phases of timings of opening and closing at least the respective intake valves,
 wherein the controller adjusts the intake introducing time period by controlling the opening/closing driving unit and the phase variable driving unit.

3. The intake control apparatus of an internal combustion engine according to claim 2, wherein the intake introducing time period is started and finished by the phase variable driving unit when a rotational number of the internal combustion engine is at high rotation.

4. The intake control apparatus of an internal combustion engine according to claim 2, wherein the intake introducing time period is started by the phase variable driving unit and is finished by the opening/closing driving unit when a rotational number of the internal combustion engine is at low rotation.

5. The intake control apparatus of an internal combustion engine according to claim 2, wherein the intake introducing time period is started by the opening/closing driving unit and finished by the phase variable driving unit when a rotational number of the internal combustion engine is at middle rotation.

6. The intake control apparatus of an internal combustion engine according to claim 2, wherein a control of finishing a time period of introducing intake air introduced into the combustion chamber is executed by one of the opening/closing driving unit and the phase variable driving unit which has a faster valve opening speed.

7. The intake control apparatus of an internal combustion engine according to claim 2, further comprising:
a pressure detecting unit for detecting pressures at insides of the respective branch intake paths on downstream sides of the respective intake control valves and outputting the pressures to the controller;
wherein the controller compares detecting information from the pressure detecting unit and a previously set value, and when the detecting information exceeds the set value, an opening degree of the intake control valve is corrected by the opening/closing driving unit such that the detecting information becomes lower than the set value.

8. The intake control apparatus of an internal combustion engine according to claim 7, wherein when the internal combustion engine is at low rotation, the controller adjusts the opening degrees of the respective intake control valves by controlling the opening/closing driving unit.

* * * * *